United States Patent
Jung

(10) Patent No.: US 9,228,474 B2
(45) Date of Patent: Jan. 5, 2016

(54) METHOD AND SYSTEM OF DETERMINING FAILURE OF UREA QUALITY SENSOR

(71) Applicants: Hyundai Motor Company, Seoul (KR); Kia Motors Corporation, Seoul (KR)

(72) Inventor: Jae-Yoon Jung, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 59 days.

(21) Appl. No.: 14/093,754

(22) Filed: Dec. 2, 2013

(65) Prior Publication Data

US 2014/0188327 A1   Jul. 3, 2014

(30) Foreign Application Priority Data

Dec. 31, 2012   (KR) .................. 10-2012-0158618

(51) Int. Cl.
- G06F 19/00 (2011.01)
- F01N 11/00 (2006.01)
- B60W 50/00 (2006.01)
- F01N 3/20 (2006.01)

(52) U.S. Cl.
CPC ............. *F01N 11/002* (2013.01); *B60W 50/00* (2013.01); *F01N 3/2066* (2013.01); *F01N 11/00* (2013.01); *F01N 2550/05* (2013.01); *F01N 2610/02* (2013.01); *F01N 2900/1814* (2013.01); *F01N 2900/1818* (2013.01); *Y02T 10/24* (2013.01); *Y02T 10/47* (2013.01)

(58) Field of Classification Search
CPC ............ G01F 25/0061; G01F 25/0069; G01F 25/0076
USPC ............................................................ 701/29
See application file for complete search history.

(56) References Cited

U.S. PATENT DOCUMENTS

| 7,987,662 | B2 * | 8/2011 | Ruona | F01N 13/009 60/274 |
| 2007/0204678 | A1 * | 9/2007 | Nishina | F01N 3/208 73/53.01 |
| 2009/0139318 | A1 * | 6/2009 | Zemskova | B01D 53/90 73/114.69 |
| 2012/0118059 | A1 | 5/2012 | Reimer et al. | |

FOREIGN PATENT DOCUMENTS

| JP | 2005-147118 A | | 6/2005 |
| JP | 2009-120054 | * | 6/2009 |
| JP | 2009120054 | * | 6/2009 |
| JP | 2010-25825 A | | 2/2010 |

\* cited by examiner

*Primary Examiner* — Muhammad Shafi
(74) *Attorney, Agent, or Firm* — Morgan, Lewis & Bockius LLP

(57) ABSTRACT

A method and a system determines failure of a urea quality sensor. The method may include: determining whether a urea temperature is higher than a predetermined temperature; determining, if the urea temperature is higher than the predetermined temperature, whether a vehicle speed is faster than a predetermined vehicle speed; determining, if the vehicle speed is faster than the predetermined vehicle speed, whether a difference between a current urea quality and a previous urea quality is higher than a predetermined urea quality; and storing a failure code if the difference between the current urea quality and the previous urea quality is higher than the predetermined urea quality.

10 Claims, 3 Drawing Sheets

METHOD AND SYSTEM OF DETERMINING FAILURE OF UREA QUALITY SENSOR

CROSS-REFERENCE TO RELATED APPLICATION

The present application claims priority of Korean Patent Application Number 10-2012-0158618 filed Dec. 31, 2012, the entire contents of which application are incorporated herein for all purposes by this reference.

BACKGROUND OF INVENTION

1. Field of Invention

The present invention relates to a method and a system of determining failure of a urea quality sensor and, more particularly, to the method and a system of determining the failure of the urea quality sensor that indicates the failure of the urea quality sensor to a driver and operates compulsory inducement if a urea quality is bad.

2. Description of Related Art

Generally, an exhaust gas exhausted through an exhaust manifold from an engine is led to a catalytic converter formed on an exhaust pipe and is purified. After that, noise of the exhaust gas is reduced during passing through a muffler and is exhausted to the air through a tail pipe.

A selective catalytic reduction (SCR) converter is one type of such catalytic converters. The SCR means that reducing agents such as urea, ammonia, carbon monoxide and hydrocarbon (HC) react better with nitrogen oxide than oxygen.

An exhaust system of a vehicle provided with the SCR converter includes a urea tank and a dosing module. The dosing module injects the reducing agents such as the urea into the exhaust gas passing through the exhaust pipe. Thereby, the SCR converter can reduce the nitrogen oxide efficiently.

However, purifying efficiency of the nitrogen oxide in the SCR converter is greatly affected by urea quality. That is, if the urea quality is not suitable, the SCR converter is hard to purify the nitrogen oxide. Therefore, regulations demand that means for warning unsuitable urea quality should be mounted at the vehicle.

Urea quality sensors are increasingly used for warning the unsuitable urea quality. In order to use the urea quality sensor, however, a method of determining failure of the urea quality sensor should be also used.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method and a system of determining failure of a urea quality sensor having advantages of warning a driver or performing driver compulsory inducement efficiently.

A method of determining failure of a urea quality sensor according to various aspects of the present invention may include: determining whether a urea temperature is higher than a predetermined temperature; determining, if the urea temperature is higher than the predetermined temperature, whether a vehicle speed is faster than a predetermined vehicle speed; determining, if the vehicle speed is faster than the predetermined vehicle speed, whether a difference between a current urea quality and a previous urea quality is higher than a predetermined urea quality; and storing a failure code if the difference between the current urea quality and the previous urea quality is higher than the predetermined urea quality.

The method may further include restricting an output or the vehicle speed after the failure code is stored.

The method may further include determining whether a difference between a current urea level and a previous urea level is larger than a predetermined urea level if the vehicle speed is slower than or equal to the predetermined vehicle speed, wherein the method returns to the determining whether the difference between the current urea quality and the previous urea quality is higher than the predetermined urea quality if the difference between the current urea level and the previous urea level is smaller than or equal to the predetermined urea level.

The method may further include: determining whether the urea quality is within a predetermined range if the difference between the current urea level and the previous urea level is larger than the predetermined urea level; and warning a driver if the urea quality is not within the predetermined range.

The method may further include operating a compulsory inducement after warning the driver.

The determining whether the urea quality is within the predetermined range may include: primarily determining whether the urea quality is within the predetermined range; and secondarily determining whether the urea quality is within the predetermined range after driving a predetermined distance, if the urea quality is not within the predetermined range.

In a method of determining failure of a urea quality sensor according to various other aspects of the present invention, the method may include storing a failure code if a difference between a current urea quality and a previous urea quality is higher than a predetermined urea quality when a urea temperature is higher than a predetermined temperature and a vehicle speed is faster than a predetermined vehicle speed. The method may further include restricting an output or the vehicle speed if the failure code is stored.

A system of determining failure of a urea quality sensor that detects a urea quality according to various aspects of the present invention may include: a urea temperature sensor detecting a urea temperature; a urea level sensor detecting a urea level; a vehicle speed sensor detecting a vehicle speed; and a control unit electrically connected to the urea temperature sensor, the urea level sensor, the urea quality sensor and the vehicle speed sensor, and determining the failure of the urea quality sensor, and executing control according the failure determination, wherein the control unit determines whether the urea temperature is higher than a predetermined temperature, determines whether the vehicle speed is faster than a predetermined vehicle speed if the urea temperature is higher than the predetermined temperature, determines whether a difference between a current urea quality and a previous urea quality is higher than a predetermined urea quality if the vehicle speed is faster than the predetermined vehicle speed, and stores a failure code if the difference between the current urea quality and the previous urea quality is higher than the predetermined urea quality.

The control unit may restrict an output or the vehicle speed after the failure code is stored.

The control unit may determine whether the difference between the current urea level and the previous urea level is larger than the predetermined urea level if the urea temperature is higher than the predetermined temperature and the vehicle speed is slower than or equal to the predetermined vehicle speed, may determine whether a difference between a current urea quality and a previous urea quality is higher than a predetermined urea quality if the difference between the current urea level and the previous urea level is smaller than or equal to the predetermined urea level, and may store the failure code if the difference between the current urea quality and the previous urea quality is higher than the predetermined urea quality.

The control unit may determine whether the urea quality is within a predetermined range if the urea temperature is higher than the predetermined temperature, the vehicle speed is slower than or equal to the predetermined vehicle speed, and the difference between the current urea level and the previous urea level is larger than the predetermined urea level, and may warn a driver if the urea quality is not within the predetermined range.

The control unit may operate a compulsory inducement after warning the driver.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
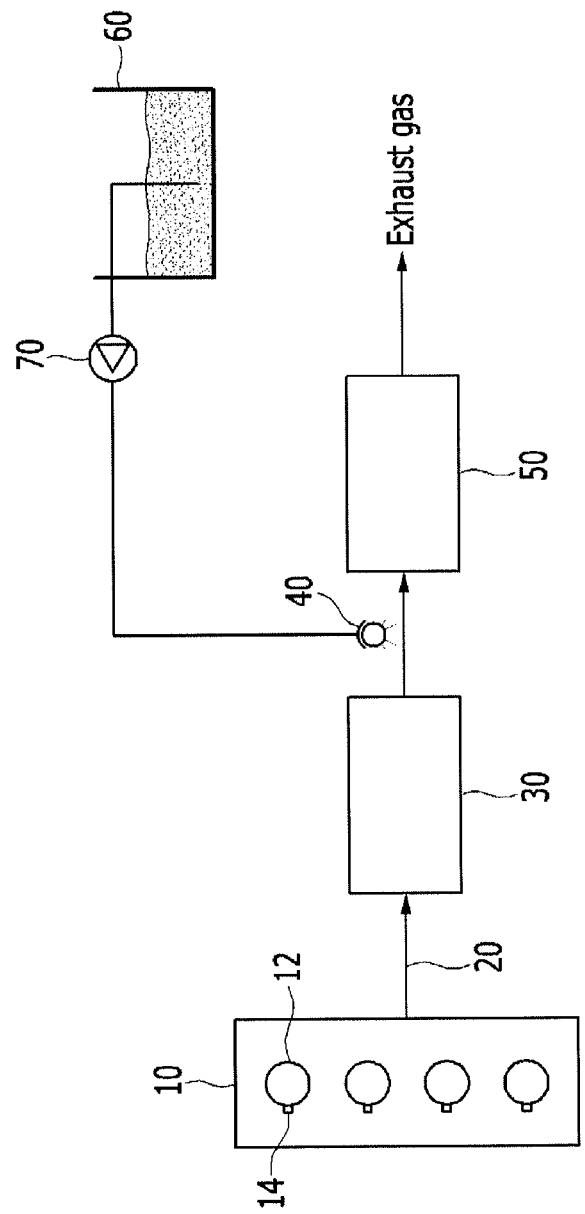
FIG. 1 is a schematic diagram of an exemplary exhaust system to which a method and a system of determining failure of a urea quality sensor according to the present invention can be applied.

FIG. 1 is a schematic diagram of an exemplary exhaust system to which a method and a system of determining failure of a urea quality sensor according to various embodiments of the present invention can be applied. As shown in FIG. 1, an exhaust gas generated at an engine 10 passes sequentially through a particulate filter 30 and a selective catalytic reduction (SCR) converter 50. In this process, noxious materials contained in the exhaust gas can be removed. As circumstances demand, an oxidation catalyst instead of the particulate filter 30 may be used or the oxidation catalyst as well as the particulate filter 30 may be used. The particulate filter 30 and the SCR converter 50 are mounted on an exhaust pipe 20.

The engine 10 burns air-fuel mixture in which fuel and air are mixed so as to convert chemical energy into mechanical energy. The engine 10 is connected to an intake manifold so as to receive the air into a combustion chamber 12, and is connected to an exhaust manifold so as to discharge the exhaust gas generated at combustion process and gathered in the exhaust manifold to the exterior of a vehicle. An injector 14 is mounted in the combustion chamber 12 so as to inject the fuel into the combustion chamber.

The exhaust pipe 20 is connected to the exhaust manifold and the exhaust gas is exhausted to the exterior of the vehicle through the exhaust pipe 20. The particulate filter 30 is mounted on the exhaust pipe 20 downstream of the engine 10 and traps soot contained in the exhaust gas. The SCR converter 50 is mounted on the exhaust pipe 20 downstream of the particulate filter 30 and reduces nitrogen oxide contained in the exhaust gas into nitrogen gas using reducing agent.

For these purposes, the exhaust system further includes a urea tank 60, a urea pump 70 and a dosing module 40. The urea tank 60 stores urea therein. The urea pump 70 pumps the urea in the urea tank 60.

The dosing module 40 injects the urea pumped by the urea pump 70 into the exhaust pipe 20. The dosing module 40 is mounted on the exhaust pipe 20 between the particulate filter 30 and the SCR converter 50 and injects the urea to the exhaust gas that will flow into the SCR converter 50. The urea injected to the exhaust gas is decomposed into ammonia and the decomposed ammonia is used as the reducing agent for the nitrogen oxide.

Figure 2:
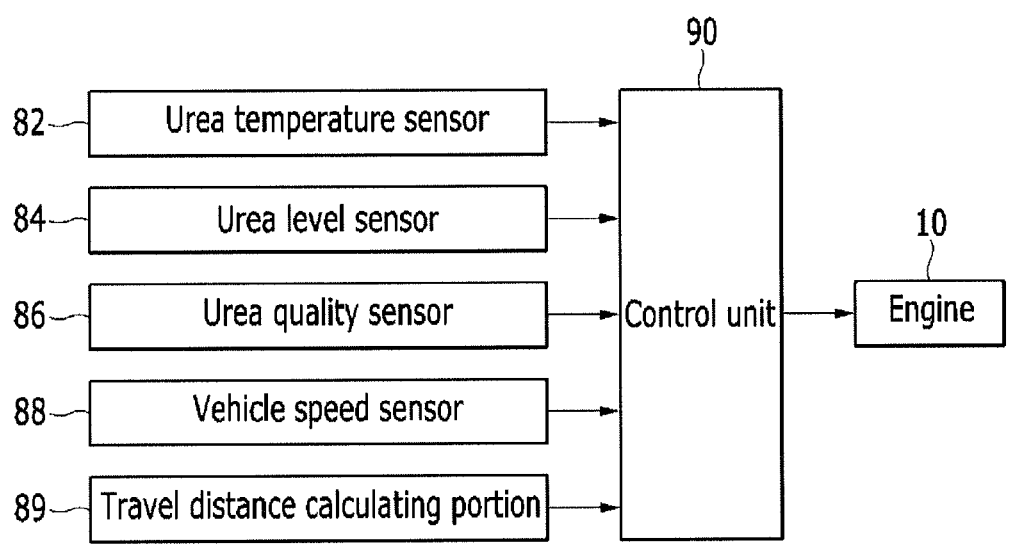
FIG. 2 is a block diagram of an exemplary system of determining failure of a urea quality sensor according to the present invention.

FIG. 2 is a block diagram of a system of determining failure of a urea quality sensor according to various embodiments of the present invention. As shown in FIG. 2, a system of determining failure of a urea quality sensor according to various embodiments of the present invention includes a urea temperature sensor 82, a urea level sensor 84, a urea quality sensor 86, a vehicle speed sensor 88, a travel distance calculating portion 89, a control unit 90 and the engine 10.

The urea temperature sensor 82 is mounted at the urea tank 60, detects a temperature of the urea stored in the urea tank 60, and transmits a signal corresponding thereto to the control unit 90.

The urea level sensor 84 is mounted at the urea tank 60 and detects a raw urea level in the urea tank 60 using, for example, ultrasonic wave. Generally, a level surface of the urea in the urea tank 60 changes continuously during the vehicle runs. In this specification, a raw urea level means the urea level detected at any moment and the urea level means an average of the raw urea level for any period. That is, the raw urea level is a value which changes continuously even though the urea is not supplied nor consumed, and the urea level is a value which does not change if the urea is not supplied nor consumed. The urea level sensor 84 may calculate the urea level based on the raw urea level and may transmit a signal corresponding thereto to the control unit 90. On the contrary, the urea level sensor 84 may transmit a signal corresponding to the raw urea level to the control unit 90. At a latter case, the control unit 90 may calculate the urea level based on the raw urea level. In this specification and claims, it is to be understood that the detecting urea level includes that the urea level sensor 84 detects the raw urea level and calculates the urea level as well as that the urea level sensor 84 detects raw urea level and the control unit 90 calculates the urea level.

The urea quality sensor 86 detects a urea quality and transmits a signal corresponding thereto to the control unit 90. Herein, the urea quality may be a urea concentration. The vehicle speed sensor 88 detects a vehicle speed and transmits a signal corresponding thereto to the control unit 90.

The travel distance calculating portion 89 calculates a distance travelled by the vehicle from at any time to current time and transmits a signal corresponding thereto to the control unit 90. The "any time" may be a time at which the urea quality was detected.

The control unit 90 is electrically connected to the urea temperature sensor 82, the urea level sensor 84, the urea quality sensor 86, the vehicle speed sensor 88 and the travel distance calculating portion 89, and receives the signals about the urea temperature, the urea level or the raw urea level, the urea quality, the vehicle speed and travel distance from the any time to the current time from the urea temperature sensor 82, the urea level sensor 84, the urea quality sensor 86, the vehicle speed sensor 88 and the travel distance calculating portion 89.

The control unit 90 is configured to determine failure of the urea quality sensor 86 based on the signals. If the failure of the urea quality sensor 86 is determined, the control unit 90 controls the engine 10 to restrict the vehicle speed or an output.

The control unit 90 can be realized by one or more processors activated by predetermined program, and the predetermined program can be programmed to perform each step of a method of determining failure of a urea quality sensor according to various embodiments of the present invention.

Hereinafter, a method of determining failure of a urea quality sensor according to various embodiments of the present invention will be described in detail with reference to FIG. 3, which is a flowchart of a method of determining failure of a urea quality sensor according to various embodiments of the present invention.

Figure 3:
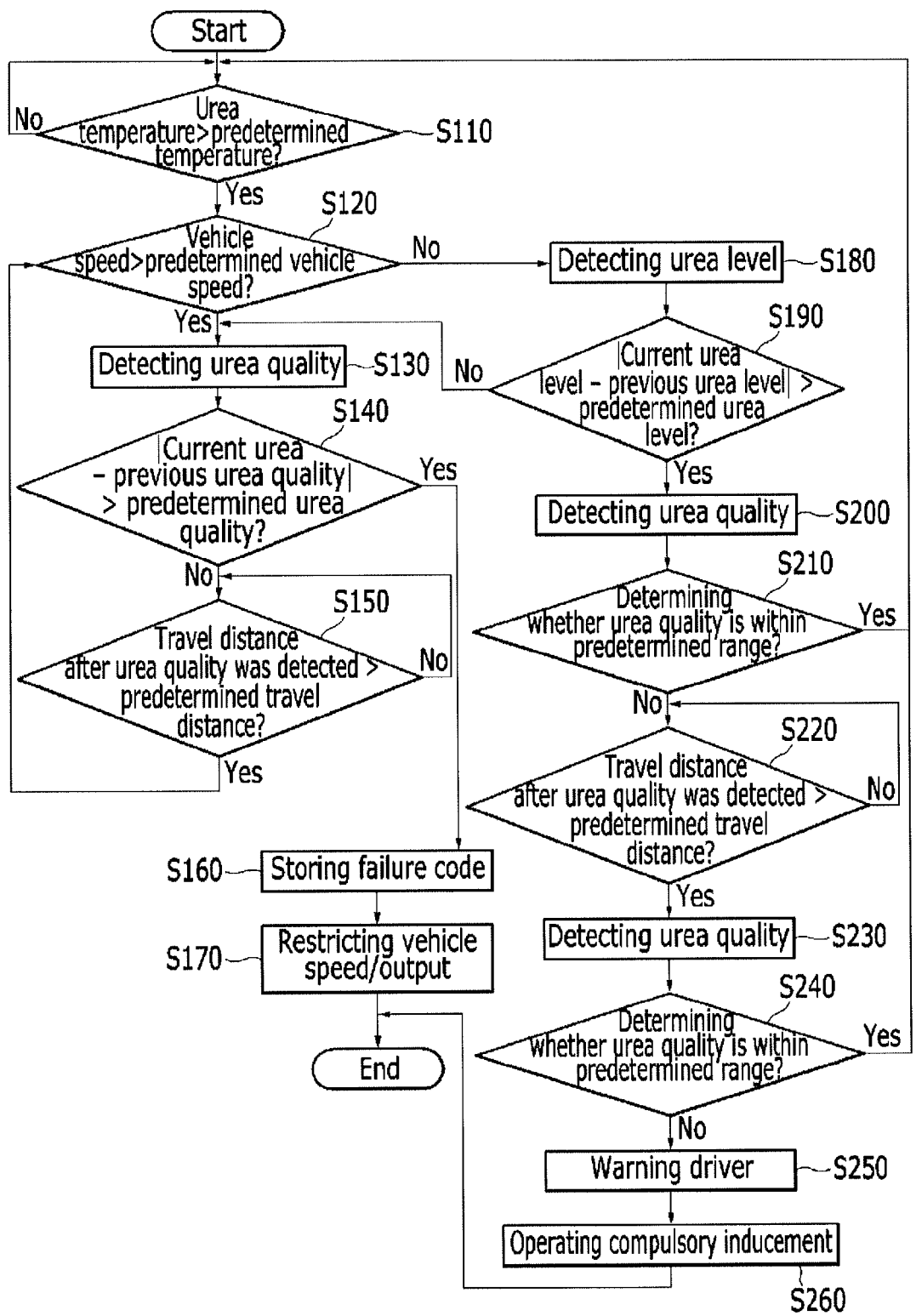
FIG. 3 is a flowchart of an exemplary method of determining failure of a urea quality sensor according to the present invention.

As shown in FIG. 3, the method of determining failure of the urea quality sensor according to various embodiments of the present invention begins by detecting the urea temperature. The control unit 90 determines whether the urea temperature is higher than a predetermined temperature at step S110. The urea quality can be changed according to the urea temperature. Particularly, if the urea temperature is very low, the urea quality changes greatly. Therefore, each step of the method of determining the failure of the urea quality sensor according to various embodiments of the present invention can be executed only when the urea temperature is higher than the predetermined temperature. Herein, a suitable value may be set as the predetermined temperature, and may be, for example, a value between 0° C.-3° C.

If the urea temperature is lower than or equal to the predetermined temperature at the step S110, the control unit 90 returns to the step S110. If the urea temperature is higher than the predetermined temperature at the step S110, the control unit 90 determines whether the vehicle speed is faster than a predetermined vehicle speed at step S120. A suitable value may be set as the predetermined vehicle speed, and may be, for example, 2 km/h.

If the vehicle speed is faster than the predetermined vehicle speed at the step S120, the control unit 90 detects the urea quality through the urea quality sensor 86 at step S130, and determines whether a difference between a current urea quality and a previous urea quality is higher than a predetermined urea quality at step S140. That is, it is determined whether the urea quality is changed even though the urea is not supplied and there is no factor for changing the urea quality. The urea quality is detected at least two times at a predetermined distance of the time at the step S130. In addition, suitable values are set as the predetermined urea quality and the predetermined distance of the time, and may be, for example, a value between 1%-2% and a value between 0.5 sec and 5 sec, respectively.

If the difference between the current urea quality and the previous urea quality is higher than the predetermined urea quality at the step S140, the control unit 90 stores failure code at step S160 and controls the engine 10 to restrict the output or the vehicle speed at step S170.

If the difference between the current urea quality and the previous urea quality is lower than or equal to the predetermined urea quality, the control unit 90 determines through the travel distance calculating portion 89 whether the travel distance after the urea quality was detected is larger than a predetermined travel distance at step S150. Herein, a suitable value is set as the predetermined travel distance, and may be, for example, a value between 5 km-50 km.

The control unit 90 adds up the travel distance until the travel distance after the urea quality was detected is larger than the predetermined travel distance at the step S150. After that, the control unit 90 returns to the step S120.

Meanwhile, if the vehicle speed is slower than or equal to the predetermined vehicle speed at the step S120, the control unit 90 detects the urea level through the urea level sensor 84 at step S180 and determines whether a difference between a current urea level and a previous urea level is larger than a predetermined urea level at step S190. That is, the control unit 90 determines whether the urea is supplied. Herein, a suitable value may be set as the predetermined urea level, and may be, for example, a value between 0.3 l-2 l.

If the difference between the current urea level and the previous urea level is smaller than or equal to the predetermined urea level at the step S190, the control unit 90 returns to the step S130 and detects the urea quality. As described above, the detection of the urea quality at the step S130 is for determining the failure of the urea quality sensor 86.

If the difference between the current urea level and the previous urea level is larger than the predetermined urea level at the step S190, the control unit 90 determines that the urea is supplied, detects the urea quality through the urea quality sensor 86 at step S200, and determines whether the urea quality is within a predetermined range at step S210. The detection of the urea quality at the step S200 is for determining whether the supplied urea is suitable. In addition, a suitable range may be set as the predetermined range, and may be, for example, between 31% and 34%.

If the urea quality is within the predetermined range at the step S210, the control unit 90 returns to the step S110.

If the urea quality is not within the predetermined range at the step S210, the control unit 90 determines whether the travel distance after the urea quality was detected is larger than a predetermined travel distance at step S220. Herein, a suitable value may be set as the predetermined travel distance, and may be, for example, a value between 5 km and 50 km.

After the control unit 90 adds up the travel distance until the travel distance after the urea quality was detected is larger than the predetermined travel distance at the step S220, the control unit 90 detects the urea quality again at step S230 and determines whether the urea quality is within the predetermined range again at step S240.

If the urea quality is within the predetermined range at the step S240, the control unit 90 returns to the step S110.

If the urea quality is not within the predetermined range at the step S240, the control unit 90 warns a driver at step S250 and operates compulsory inducement at step S260. The compulsory inducement may include restricting of the output or the vehicle speed or prohibiting starting.

Since failure of the urea quality sensor can be diagnosed as described above, it may be prevented in advance that the case occurs where regulations can be broken, according to various embodiments of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining failure of a urea quality sensor, comprising:
   determining, by a control unit, whether a urea temperature detected by a urea temperature sensor is higher than a predetermined temperature;
   determining by the control unit, if the urea temperature is higher than the predetermined temperature, whether a vehicle speed detected by a vehicle speed sensor is faster than a predetermined vehicle speed;
   determining by the control unit, if the vehicle speed is faster than the predetermined vehicle speed, whether a difference between a current urea quality and a previous urea quality, each detected by a urea quality sensor, is higher than a predetermined urea quality;
   determining, by the control unit, whether a failure occurs based on a signal transmitted to the control unit from the urea quality sensor relating to the current and previous urea qualities; storing by the control unit, a failure code if the difference between the current urea quality and the previous urea quality is higher than the predetermined urea quality; and
   the control unit warning the driver and restricting the engine output, restricting the vehicle speed, or prohibiting starting.

2. The method of claim 1, further comprising determining whether a difference between a current urea level and a previous urea level is larger than a predetermined urea level if the vehicle speed is slower than or equal to the predetermined vehicle speed,
   wherein the method returns to the determining whether the difference between the current urea quality and the previous urea quality is higher than the predetermined urea quality if the difference between the current urea level and the previous urea level is smaller than or equal to the predetermined urea level.

3. The method of claim 2, further comprising:
   determining whether the urea quality is within a predetermined range if the difference between the current urea level and the previous urea level is larger than the predetermined urea level; and
   warning a driver if the urea quality is not within the predetermined range.

4. The method of claim 3, further comprising operating a compulsory inducement after warning the driver.

5. The method of claim 3, wherein the determining whether the urea quality is within the predetermined range comprises:
   primarily determining whether the urea quality is within the predetermined range; and
   secondarily determining whether the urea quality is within the predetermined range after driving a predetermined distance, if the urea quality is not within the predetermined range.

6. A system of determining failure of a urea quality sensor that detects a urea quality, comprising:
   a urea temperature sensor detecting a urea temperature;
   a urea level sensor detecting a urea level;
   a vehicle speed sensor detecting a vehicle speed; and
   a control unit electrically connected to the urea temperature sensor, the urea level sensor, the urea quality sensor and the vehicle speed sensor, and determining the failure of the urea quality sensor, and executing control according to the failure determination,
   wherein the control unit determines whether the urea temperature is higher than a predetermined temperature, determines whether the vehicle speed is faster than a predetermined vehicle speed if the urea temperature is higher than the predetermined temperature, determines whether a difference between a current urea quality and a previous urea quality, each detected by the urea quality sensor, is higher than a predetermined urea quality if the vehicle speed is faster than the predetermined vehicle speed determines whether a failure occurs based on signals transmitted from the urea quality sensor relating to the current and previous urea qualities, and stores a failure code if the difference between the current urea quality and the previous urea quality is higher than the predetermined urea quality, the control unit warning the driver and restricting the engine output, restricting the vehicle speed, or prohibiting starting.

7. The system of claim 6, wherein the control unit controls an engine to restrict an output thereof or the vehicle speed after the failure code is stored.

8. The system of claim 6, wherein the control unit determines whether the difference between the current urea level and the previous urea level is larger than the predetermined urea level if the urea temperature is higher than the predetermined temperature and the vehicle speed is slower than or equal to the predetermined vehicle speed, determines whether a difference between a current urea quality and a previous urea quality is higher than a predetermined urea quality if the difference between the current urea level and the previous urea level is smaller than or equal to the predetermined urea level, and stores the failure code if the difference between the current urea quality and the previous urea quality is higher than the predetermined urea quality.

9. The system of claim 8, wherein the control unit determines whether the urea quality is within a predetermined range if the urea temperature is higher than the predetermined temperature, the vehicle speed is slower than or equal to the predetermined vehicle speed, and the difference between the current urea level and the previous urea level is larger than the predetermined urea level, and warns a driver if the urea quality is not within the predetermined range.

10. The system of claim 9, wherein the control unit operates a compulsory inducement after warning the driver.

* * * * *